United States Patent [19]

Sato et al.

[11] 4,323,787
[45] Apr. 6, 1982

[54] AUTOMATIC POWER SUPPLY APPARATUS

[75] Inventors: Tadashi Sato; Toyoji Hara; Tadashi Tomita, all of Toda, Japan

[73] Assignee: Clarion Co., Ltd., Tokyo, Japan

[21] Appl. No.: 92,891

[22] Filed: Nov. 9, 1979

[30] Foreign Application Priority Data

Nov. 16, 1978 [JP] Japan .................. 53/156781[U]

[51] Int. Cl.³ .............................................. H02J 1/00
[52] U.S. Cl. ................................. 307/38; 307/115; 307/155; 307/10 R
[58] Field of Search ............... 307/112, 149, 154, 155, 307/10 R, 38, 115

[56] References Cited

PUBLICATIONS

Clarion Service Manual for Model GA-502E and GD-502E, Aug. 1978.

Primary Examiner—Michael L. Gellner
Assistant Examiner—James L. Dwyer
Attorney, Agent, or Firm—Blanchard, Flynn, Thiel, Boutell & Tanis

[57] ABSTRACT

An automatic power supply apparatus which comprises at least a cassette deck box and an audio box, said cassette deck box including an automatic power supply circuit, a control amplifier, a switch means for selectively connecting a power supply to a tape player or a radio, etc., said audio box including a relay for connecting and disconnecting the power supply, an audio amplifier connected to the relay, etc. When the switch is set to the tape recorder side, the power supply is connected to the control amplifier and the relay, and when the switch is set to the radio side, the automatic power supply circuit is energized so as to connect the power supply to the control amplifier and the relay.

2 Claims, 1 Drawing Figure

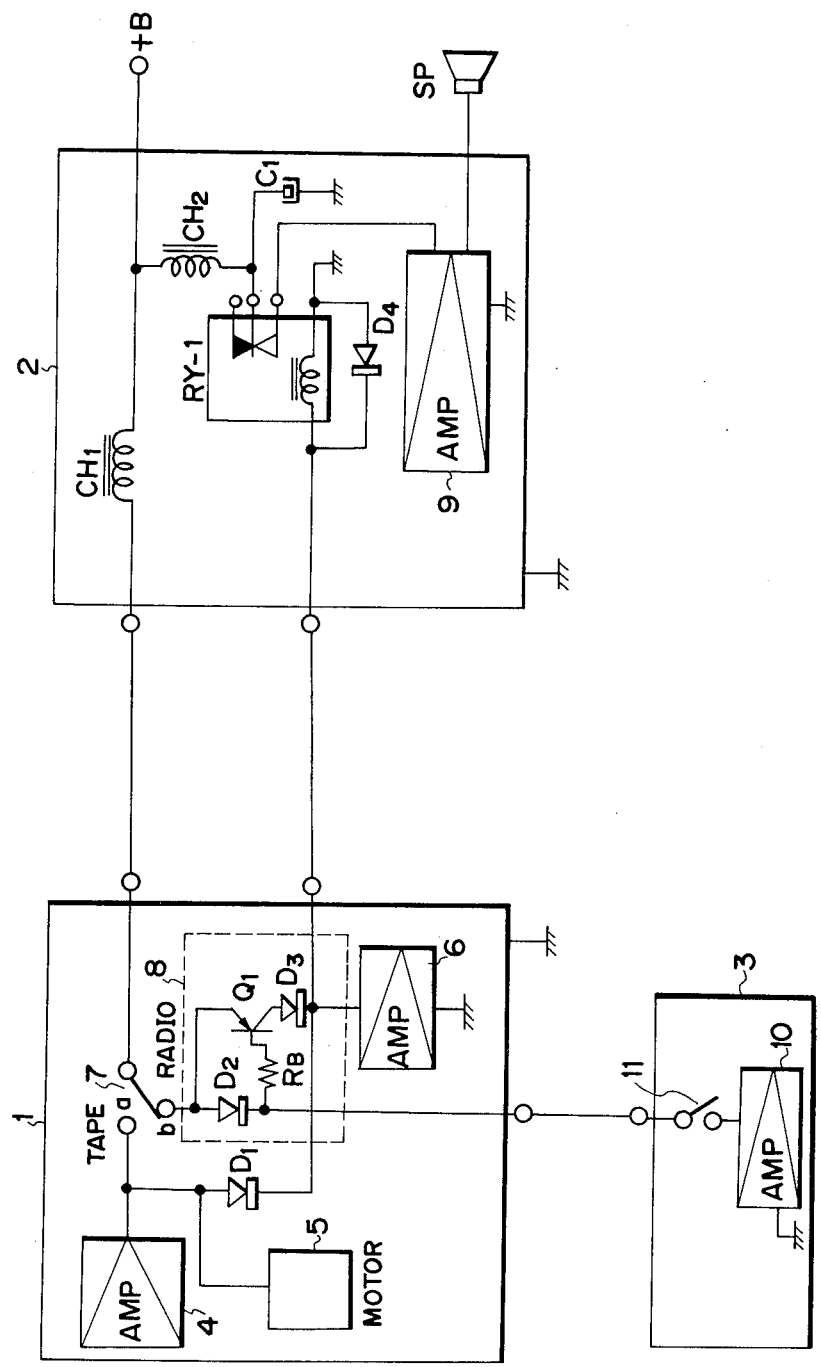

AUTOMATIC POWER SUPPLY APPARATUS

TECHNICAL FIELD OF THE INVENTION

This invention relates to an automatic electric power supply circuit, and more particularly to an improvement in the automatic power supply circuit suitable for a car stereo apparatus having circuits provided in two or more boxes.

BACKGROUND ART

A known electric power supply circuit for a car stereo apparatus employs such a system that the power supply circuit is adapted, when the power is on, to supply required voltages to respective component boxes of the car stereo apparatus in response to operation of an external switch. The known system, however, has a disadvantage that the electric power supply system is complicated and a large number of electric power connecting cords are required in the system. The system has another disadvantage that the system cannot be applied to a part of the circuits constituting the car stereo apparatus.

SUMMARY OF THE INVENTION

The present invention has been made with a view to elimination of the disadvantages involved in the known art.

It is therefore an object of the present invention to provide an automatic power supply apparatus for a car stereo apparatus including circuits provided in two or more boxes.

In accordance with the invention, there is provided an automatic power supply apparatus for electrically connecting a power supply to a plurality of boxes constituting a car stereo apparatus, which comprises:

an automatic power supply circuit provided within at least one of said boxes;

a power supply selector switch connected to said automatic power supply circuit;

a relay provided within another box for electrically connecting and disconnecting the power supply;

first connecting means for electrically connecting said power supply to said relay and turning it on when said switch is set to a non-automatic-power-supply-circuit side; and second connecting means for electrically connecting the power supply to the box through said relay when said relay is in an ON state.

BRIEF DESCRIPTION OF THE DRAWING

FIGURE is a diagrammatic view of one embodiment of the invention.

PREFERRED EMBODIMENT OF THE INVENTION

The invention will now be described referring to an embodiment illustrated in the accompanying drawing. In the FIGURE, 1 is a cassette deck box, 2 an audio box, and 3 a tuner box which constitute for example a car stereo apparatus.

The deck box 1 comprises a pre-amplifier 4, a control motor 5, a control amplifier 6, an automatic power supply circuit 8 and a selector switch 7. The switch 7 is adapted to be switched from a contact a to a contact b and vice versa upon loading and unloading of a cassette tape. The automatic power supply circuit 8 comprises, for example, a transistor $Q_1$, diodes $D_2$ and $D_3$ and a resistor $R_B$. Specific audio connections between the pre-amplifier 4, the tape playing mechanism including control motor 5 and the control amplifier 6 may be conventional and are not relevant to the invention and thus need not be discussed here.

The audio box 2 includes an audio amplifier 9, a relay RY-1, choke coils $CH_1$ and $CH_2$, a capacitor $C_1$ and a diode $D_4$. An audio input to the audio amplifier 9 is supplied from the cassette deck box 1 or the tuner box 3, but details in this respect may be conventional and are not given here because they are not an essential part of the invention. SP is a speaker driven by audio amplifier 9.

A tuner box 3 includes an amplifier 10 and a switch 11. An audio input of the amplifier 10 is coupled to a tuner (not illustrated), but the specific connection may be conventional and is not essential to the present invention and thus is omitted here.

When a cassette tape (not illustrated) is put into the cassette deck box 1, the switch 7 is set in a position of the terminal a so that a +B power supply is electrically connected to the pre-amplifier 4 and the control motor 5 and the power supply is further connected to the control amplifier 6 and the relay RY-1 through a diode $D_1$. The relay RY-1 then conducts to electrically connect the +B power supply to the audio amplifier 9 to energize the same.

When the cassette tape is thereafter removed, the switch 7 returns to a position of the terminal b and the automatic power supply circuit 8 is thrown into a standby condition.

At this time, if the switch 11 of the tuner box 3 is closed, a current begins to flow through the diode $D_2$ and a forward voltage $V_F$ occurs across the diode $D_2$. The transistor $Q_1$ is then turned on and the +B power supply is connected to the control amplifier 6 and the relay RY-1 to turn them on.

As apparent from the foregoing, the present invention enables a plurality of boxes constituting the car stereo to be subjected to the automatic power supply system only by providing additional one lead wire. Further according to the invention, the power supply system is simple for a multi-box type apparatus and the automatic power supply system can be applied to a part of the circuits of the apparatus.

We claim:

1. An automatic power supply apparatus for electrically connecting an electric power supply to a plurality of boxes including at least a cassette deck box, a tuner box and an audio box, which apparatus comprises:

an electric power supply line connected to an electric power supply;

a cassette responsive selector switch connected to said electric power supply line, said switch being located in said cassette deck box and being switched by loading of a cassette into said cassette deck box and by unloading of the cassette from such cassette deck box;

an automatic electric power supply circuit located within said cassette deck box, said circuit being connected to said cassette responsive switch and electrically energized thereby depending on the state of said cassette responsive switch;

a relay located within said audio amplifier box, said relay being connected to said automatic supply circuit to turn on said relay and thereby cause said relay to provide electric power from said power supply line to a circuit within said audio amplifier box in response to said cassette responsive switch being actuated to operate said automatic supply circuit; and a manually operable switch located within said tuner box and connected between said automatic supply circuit and a circuit within said tuner box;

said automatic supply circuit including at least one transistor and a diode, said diode being coupled to said cassette responsive switch to turn on said transistor so as to provide said electric power to said relay and to a circuit within said cassette box when said cassette responsive switch is so actuated as to provide a forward voltage across the diode;

said cassette responsive switch being switchable between a tape operating terminal and a tuner operating terminal, said manually operable switch in said tuner box being connected in series with said tuner operating terminal of said cassette responsive switch through said diode, such that closure of said manually operable switch in said tuner box and switching of said cassette responsive switch to its tuner operating terminal are both required to turn on said transistor and thereby provided said electrical power to said relay and said circuit within said cassette deck box, the last-mentioned circuit being a control amplifier, a further diode connected between said tape operating terminal of said cassette responsive switch and a point at which said transistor applies said electric power to said control amplifier, said further diode being oriented to positively block electric current flow from said point back toward said tape operating terminal of said cassette responsive switch, said cassette deck box further including a tape pre-amp and cassette drive motor connected between said tape operating terminal of said cassette responsive switch and said further diode, such that said tape pre-amp and tape drive motor receive electric power only with said cassette responsive switch in its tape selecting position, and not from said transistor.

2. An automatic power supply apparatus for electrically connecting an electric power supply to a plurality of boxes including at least a cassette deck box, a tuner box and an audio amplifier box, which boxes constitute a car music reproduction system, the power supply apparatus comprising:

an electric power supply line connected to an electric power supply, said electric power supply line extending between said cassette box and audio amplifier box;

a further line connecting said cassette box and audio box;

a cassette responsive selector switch connected to said electric power supply line, said switch being located in said cassette deck box and being switched to a tape playing terminal upon loading of a cassette into said cassette deck box, and being switched back to a tuner playing terminal by unloading of the cassette from the cassette deck box;

a first diode connecting the cassette responsive switch in its tape playing terminal to said further line so as to apply electric power to the latter;

an automatic electric power supply circuit connected between the tuner playing terminal of said cassette responsive switch and said further line and actuable for applying electric power to said further line, said electric supply circuit including electronic switch means responsive to current flow from said cassette responsive switch at its tuner playing terminal through a third electric power supply line to said tuner box for applying said electric power to said further line through a further diode, said tuner box including a manually operable switch manually actuable to permit said application of power through said third electric power line to said tuner box, such that energization of said further line by said automatic electric supply circuit depends on the position of both said switches;

said cassette deck box including a tape drive motor and tape pre-amp connected to receive electric power between said tape playing terminal of said cassette responsive switch and said first diode so as to be nonenergizable by said automatic electric power supply circuit, said cassette deck box further including a control amplifier connected to said further line to receive electric power through said first diode with said cassette responsive switch at its tape playing terminal and through said automatic electric supply circuit with said cassette responsive switch at its turner playing terminal;

a relay in said audio box connected to said further line for actuation upon application of electric power to said further line, said relay having a normally open contact connected between said electric power supply line and an audio amplifier in said audio box and responsive to said application of electric power to said further line for connecting said electric power supply line to said audio amplifier;

whereby the number of electric power lines interconnecting said boxes is minimized while avoiding application of electric power to said tuner while playing a tape and to said tape pre-amp and motor while playing the tuner and while maintaining said audio amplifier off during switching of said cassette responsive switch.

* * * * *